UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

PHARMACEUTICAL COMPOUND.

1,082,510.  Specification of Letters Patent.  Patented Dec. 30, 1913.

No Drawing.  Application filed August 27, 1912. Serial No. 717,248.

*To all whom it may concern:*

Be it known that I, EMIL FISCHER, doctor of philosophy, professor of chemistry, citizen of the German Empire, residing at Berlin, Germany, have invented new and useful Improvements in New Pharmaceutical Compounds, of which the following is a specification.

The acids of the acetylene series possess the property hitherto not yet observed that on being heated with the halogen compounds of phosphorus they combine with these products. On using for this reaction high molecular substances, such as stearolic acid ($C_{18}H_{32}O_2$) or behenolic acid ($C_{22}H_{40}O_2$) products similar to fats are obtained which are absorbed in the digestive organs and appear therefore to be valuable for therapeutic purposes. The products thus obtained contain in addition to phosphorus, halogen in a quantity approximately equivalent to the amount of phosphorus. They are brownish semi-fluid compounds insoluble in water and soluble in alcohol. They are acids and form soluble alkali salts and insoluble calcium and strontium salts.

In order to illustrate the new process more fully the following examples are given, the parts being by weight:

Example 1: 1 part of stearolic acid and 1 part of $PCl_3$ are heated for 15 hours to 140° C. The product of the reaction consists of a yellowish liquid and an orange colored tough resin. Unchanged $PCl_3$ is distilled off *in vacuo* and the residue is treated several times with water, then made with water into a very fine paste and shaken at 0° C. with a normal caustic potash solution, by which treatment a large quantity of the substance is dissolved. The quickly filtered alkaline liquid is acidulated with hydrochloric acid and the precipitated fat like substance is extracted with ether. A resinous orange-yellow substance insoluble in ether and containing about 15 per cent. of phosphorus remains. On evaporation of the ether from the ethereal solution a thick brownish organic acid remains containing 4–5 per cent. of phosphorus and about 8 per cent. chlorin. It forms colorless and tasteless calcium and strontium salts containing about 5 per cent. of phosphorus. It is insoluble in water and soluble in the usual organic liquids *e. g.* alcohol and ether. In the same way $PCl_3$ acts upon the behenolic acid. The product is less colored than the corresponding stearolic acid compound.

Example 2: 1 part of behenolic acid and 2 parts of $PBr_3$ are heated for 9 hours to 140° C. The resulting compound is a reddish-brown thick oil which when worked up as described in Example 1 yields the organic acid as a dark colored thick fluid containing about 2.5 per cent. phosphorus.

I claim:—

1. The herein described new high molecular fatty acid compounds containing phosphorus and halogen, which in the acid form are semi-fluid brownish compounds practically insoluble in water and soluble in alcohol, forming salts with metals which retain the valuable therapeutic properties exhibited by the acids, substantially as described.

2. The herein described new high-molecular fatty acid compounds containing phosphorus and chlorin, which in the acid form are semi-fluid brownish compounds practically insoluble in water and soluble in alcohol, forming salts with metals which retain the valuable therapeutic properties exhibited by the acids, substantially as described.

3. The herein described new product being a stearolic acid compound containing phosphorus and halogen, which is in the acid form a semi-fluid brownish compound insoluble in water and soluble in alcohol and ether, forming metal salts which retain the valuable therapeutic properties exhibited by the acid, substantially as described.

4. The herein described new product being a stearolic acid compound containing phosphorus and chlorin, which is in the acid form a semi-fluid brownish compound insoluble in water and soluble in alcohol and ether, forming metal salts which retain the valuable therapeutic properties exhibited by the acid, substantially as described.

In testimony whereof I have hereunto set my hand in the presence of two subscribing witnesses.

EMIL FISCHER.

Witnesses:
HENRY HASPER,
ARTHUR SCHROEDER.